(12) United States Patent
El-Mahdy et al.

(10) Patent No.: US 8,160,388 B2
(45) Date of Patent: Apr. 17, 2012

(54) SPATIALLY SELECTIVE TRANSFORMATION OF A SPATIALLY VARYING OPTICAL CHARACTERISTIC OF AN IMAGE IN AN ARRAY OF PIXELS

(75) Inventors: Ahmed Hazem Mohamed Rashid El-Mahdy, Alexandria (EG); Hisham ElShishiny, Giza (EG)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 12/140,330

(22) Filed: Jun. 17, 2008

(65) Prior Publication Data
US 2009/0310887 A1 Dec. 17, 2009

(51) Int. Cl.
*G06K 9/36* (2006.01)
*G06K 9/64* (2006.01)
(52) U.S. Cl. .......... 382/276; 382/279; 382/283
(58) Field of Classification Search .......... 382/232–253, 382/260–265, 276–283
See application file for complete search history.

(56) References Cited

U.S. PATENT DOCUMENTS
2009/0220152 A1* 9/2009 Tiwari et al. .......... 382/173
2009/0310015 A1 12/2009 El-Mahdy et al.

FOREIGN PATENT DOCUMENTS
EP 0877338 A3 11/1998

OTHER PUBLICATIONS

Reinhard et al.; Photographic Tone Reproduction for Digital Images: SIGGRAPH '02: Proceedings of the 29th Annual Conference on Computer Graphics and Interactive Techniques; pp. 267-276, New York, NY, USA, ACM Press (2002).
Bader et al.; FFTC: Fastest Fourier Transform for the IBM Cell Broadband Engine; © Springer-Verlag Berlin Heidelberg 2007; pp. 172-184.
The Discrete Fourier Transform; pp. 110-115, Dec. 14, 2011.
Goodnight et al.; Interactive Time-Dependent Tone Mapping Using Programmable Graphics Hardware; Eurographics Symposium on Rendering 2003; pp. 1-13.
Spirig et al.; A Smart CCD Image Sensor with Real-Time Programmable parallel Convolution Capabilities; IEEE Transactions on Circuits and Systems—I: Fundamental Theory and Applications, vol. 44, No. 5; May 1997; pp. 465-468.

(Continued)

*Primary Examiner* — Brian Le
(74) *Attorney, Agent, or Firm* — Schmeier, Olsen & Watts; Jeanine Ray

(57) ABSTRACT

A method and system for selectively transforming a spatially varying optical characteristic (F) of an image in a pixel array. The pixel array is segmented into stripes of contiguous rows. A two-dimensional convolution C(x, y) of F is determined at only selected pixels (x, y). C(x, y) is a function of a product of a horizontal kernel h(x) and a vertical kernel v(y). Determining C(x, y) at each selected pixel (x, y) includes determining n vertical convolutions, wherein each vertical convolution is equal to a scalar product of F and v(y) in a kernel space surrounding (x,y), forming an array (V) from the n vertical convolutions, and computing C(x,y) as a scalar product of V and a constant horizontal vector (H) formed from h(x). The stripes are collected to form a transformed image which is stored and/or displayed. A cache facilitates selective reuse of vertical convolutions for determining C(x,y).

20 Claims, 12 Drawing Sheets

OTHER PUBLICATIONS

Airtsugi et al.; Several Partitioning Strategies for Parallel Image Convolution in a Network of Heterogeneous Workstations; Parallel Computing, vol. 27, Issue 3, 2001; Elsevier Science B.V.; pp. 269-293.

Cypher et al.; SIMD Architectures and Algorithms for Image Processing and Computer Vision; IEEE Transactions on Acoustics, Speech, and Signal Processing, vol. 37, No. 12, Dec. 1989; pp. 2158-2174.

* cited by examiner

SPATIALLY SELECTIVE TRANSFORMATION OF A SPATIALLY VARYING OPTICAL CHARACTERISTIC OF AN IMAGE IN AN ARRAY OF PIXELS

FIELD OF THE INVENTION

The present invention provides a method and system for selectively transforming a spatially varying optical characteristic of an image in an array of pixels.

BACKGROUND OF THE INVENTION

There is currently a sustained convergence of multimedia applications and multi-core processors (e.g. next generation game consoles). The onset of multi-core architecture changes significantly programming semantics into parallel programming, rendering existing techniques unsuitable. Therefore, the convergence requires novel techniques to exploit the benefits of the new features of multi-core technology.

One of the basic operations widely used in image processing and other multimedia applications is convolution. It is used in a wide variety of applications in image processing such as image filtering, image coding and compression, image analysis and evaluation and computing shape descriptors for objects. It is also used for analysis and computation in many fields of mathematics and engineering.

In processing an image defined on an array of pixels, convolutions may be selectively required at some pixels but not at other pixels. Unfortunately, current techniques for computing convolutions selectively at the pixels of an image do not sufficiently exploit this selectivity and thus lack efficiency.

Accordingly, there is a need for a method and system that computes convolutions selectively at pixels of an image in a manner that sufficiently exploits this selectivity to improve the efficiency of computing the convolutions.

SUMMARY OF THE INVENTION

The present invention provides a method for selectively transforming a spatially varying optical characteristic (F) of an image in an array of pixels, said array characterized by NY rows of pixels oriented in an X direction and NX columns of pixels oriented in a Y direction, said NX and NY each at least 5, said optical characteristic denoted as F(x,y) such that x and y are indexes of pixels in the X and Y directions, said method implemented by execution of instructions by a processor of a computer system, said instructions being stored on computer readable storage media of the computer system, said method comprising:

segmenting the array of pixels into at least one stripe, wherein each stripe consists of a contiguous sequence of rows of the array of pixels;

transforming the rows of each stripe, said transforming comprising determining a two-dimensional convolution C(x, y) of F at only selected pixels (x, y) in each stripe, wherein C(x, y) is a function of a product of a horizontal kernel h(x) and a vertical kernel v(y), said h(x) and v(y) each of dimension n≧3, wherein said determining C(x, y) at each selected pixel (x, y) in each row of each stripe comprises: determining n vertical convolutions such that each vertical convolution is equal to a scalar product of F and v(y) in a kernel space surrounding (x,y), forming an array (V) of dimension n from the n vertical convolutions, and computing C(x,y) as a scalar product of V and a constant horizontal vector (H) formed from h(x);

after said transforming, collecting the stripes to form a transformed image;

storing and/or displaying the transformed image, wherein a current row of a current stripe of the at least one stripe comprises a contiguous ordered sequence of a selected pixel (S1) at which C(x, y) is determined, u unselected pixels at which C(x, y) is not determined such that 1≦u≦(n−2), and a selected pixel (S2) at which C(x y) is determined after C(x, y) at S1 is determined.

The present invention provides a computer program product, comprising a computer readable storage medium having a computer readable program code stored therein, said computer readable program code containing instructions that when executed by a processor of a computer system implement a method for selectively transforming a spatially varying optical characteristic (F) of an image in an array of pixels, said array characterized by NY rows of pixels oriented in an X direction and NX columns of pixels oriented in a Y direction, said NX and NY each at least 5, said optical characteristic denoted as F(x,y) such that x and y are indexes of pixels in the X and Y directions, said method comprising:

segmenting the array of pixels into at least one stripe, wherein each stripe consists of a contiguous sequence of rows of the array of pixels;

transforming the rows of each stripe, said transforming comprising determining a two-dimensional convolution C(x, y) of F at only selected pixels (x, y) in each stripe, wherein C(x, y) is a function of a product of a horizontal kernel h(x) and a vertical kernel v(y), said h(x) and v(y) each of dimension n≧3, wherein said determining C(x, y) at each selected pixel (x, y) in each row of each stripe comprises: determining n vertical convolutions such that each vertical convolution is equal to a scalar product of F and v(y) in a kernel space surrounding (x,y), forming an array (V) of dimension n from the n vertical convolutions, and computing C(x,y) as a scalar product of V and a constant horizontal vector (H) formed from h(x);

after said transforming, collecting the stripes to form a transformed image;

storing and/or displaying the transformed image, wherein a current row of a current stripe of the at least one stripe comprises a contiguous ordered sequence of a selected pixel (S1) at which C(x, y) is determined, u unselected pixels at which C(x, y) is not determined such that 1≦u≦(n−2), and a selected pixel (S2) at which C(x y) is determined after C(x, y) at S1 is determined.

The present invention provides a computer system comprising a processor and a computer readable memory unit coupled to the processor, said memory unit containing instructions that when executed by the processor implement a method for selectively transforming a spatially varying optical characteristic (F) of an image in an array of pixels, said array characterized by NY rows of pixels oriented in an X direction and NX columns of pixels oriented in a Y direction, said NX and NY each at least 5, said optical characteristic denoted as F(x,y) such that x and y are indexes of pixels in the X and Y directions, said method comprising:

segmenting the array of pixels into at least one stripe, wherein each stripe consists of a contiguous sequence of rows of the array of pixels;

transforming the rows of each stripe, said transforming comprising determining a two-dimensional convolution C(x, y) of F at only selected pixels (x, y) in each stripe, wherein C(x, y) is a function of a product of a horizontal kernel h(x) and a vertical kernel v(y), said h(x) and v(y) each of dimension n≧3, wherein said determining C(x, y) at each selected pixel (x, y) in each row of each stripe comprises: determining n vertical convolutions such that each vertical convolution is equal to a scalar product of F and v(y) in a kernel space surrounding (x,y), forming an array (V) of dimension n from the n vertical convolutions, and computing C(x,y) as a scalar product of V and a constant horizontal vector (H) formed from h(x);

after said transforming, collecting the stripes to form a transformed image;

storing and/or displaying the transformed image, wherein a current row of a current stripe of the at least one stripe comprises a contiguous ordered sequence of a selected pixel (S1) at which C(x, y) is determined, u unselected pixels at which C(x, y) is not determined such that 1≦u≦(n−2), and a selected pixel (S2) at which C(x y) is determined after C(x, y) at S1 is determined.

The present invention provides a method and system that computes convolutions selectively at pixels of an image in a manner that sufficiently exploits a spatial selectivity associated with selectively computing convolutions at some pixels but not at other pixels, which improves the efficiency of computing the convolutions.

DETAILED DESCRIPTION OF THE INVENTION

Figure 1:
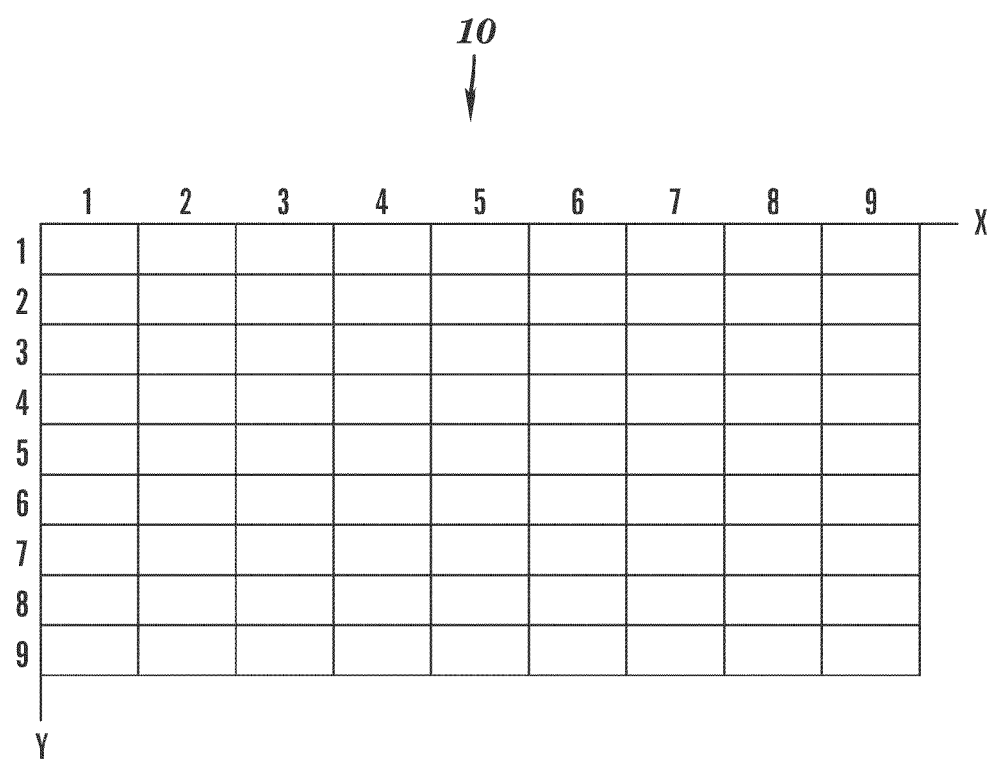
FIG. 1 is a pixel array in which convolutions are computed with spatial selectivity, in accordance with embodiments of the present invention.
Figure 2:
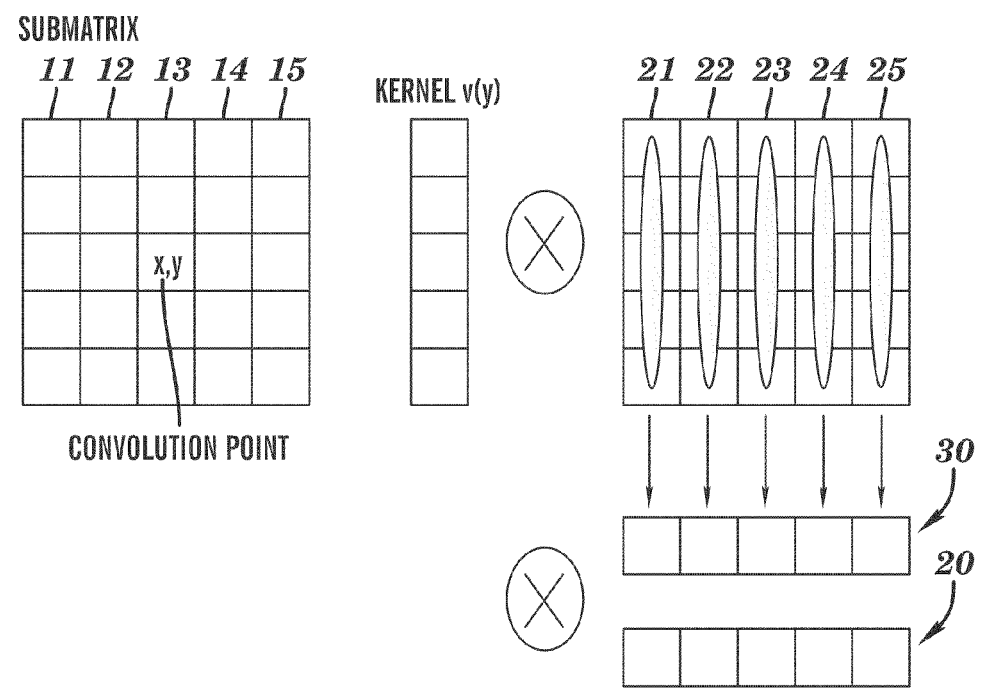
FIG. 2 is a graphical illustration of how a two-dimensional convolution may be computed with a separable kernel, in accordance with embodiments of the present invention.

FIG. 1 is a pixel array 10 in which convolutions are computed with spatial selectivity, in accordance with embodiments of the present invention. The pixel array 10 is an array of pixels comprising rows and columns of pixels. The rows are oriented in the X direction and stacked in the Y direction. The columns are oriented in the Y direction and stacked in the X direction. The total number of columns and the total number of rows of the pixel array are denoted as NX and NY, respectively. Thus the column numbers of the pixel array are 1, 2, . . . , NX and the row numbers of the pixel array are 1, 2, . . . , NY. NX and NY are each at least 5. In FIG. 2, NX=NY=9, and the pixel array 10 comprises 81 pixels. The X and Y directions will be labeled as horizontal and vertical directions, respectively, for convenience only. However, the equations and algorithms of the present invention are invariant to interchanging X and Y. Therefore, the terms "horizontal" and "vertical" are intended to convey the concept of the X and Y directions being mutually perpendicular, but do not imply that the X or Y directions have any particular orientation with respect to a vector that is normal to the earth's surface.

Given two matrices F(x, y) and K(x, y) such that K comprises n×n elements, a two-dimensional convolution C(x, y) is given by:

$$C(x, y) = F(x, y) \otimes K(x, y)$$
$$= \sum_{i=x-floor((n-1)/2)}^{x+ceiling((n-1)/2)} \sum_{j=y-floor((n-1)/2)}^{y+ceiling((n-1)/2)} F(i, j) \cdot K(|x-i|, |y-j|)$$

wherein i and j respectively denote pixel indexes in the X and Y directions, and wherein x and y respectively denote a pixel index in the X and Y direction at which the two-dimensional convolution C(x, y) is calculated.

The matrix F denotes a spatially varying optical characteristic (F) of an image in the pixel array 10. The optical characteristic may comprise, inter alia, an image intensity, luminance, etc.

The convolution C(x, y) essentially computes the amount of overlap between the matrix F and the kernel K. One of the applications is computing local intensity or luminance of an image at the pixel (x, y), which may be achieved by setting F to be the image intensity or luminance, and K to be a weight matrix, wherein K may be derived from a two-dimensional Gaussian surface. The convolution C(x, y) computes a weighted average of pixel values over a kernel space with the pixel at (x, y) having highest weight.

In one embodiment, C(x, y) is determined efficiently and selectively (at certain points), using a single processor or using multi-core processors. 'Selectively' means that applications might not necessarily need to compute convolution values at all pixels of the image, but may require convolution values only at selected pixels. The selected pixels may be determined in any manner, such as from user input, default selected pixels, pixels outputted by a computer code, etc. For example, an image application may be only concerned with computing intensities of certain irregular image regions. That may be beneficial when memory is limited, which is typical in embedded multi-core processors. Such selective processing reduces memory requirement of the convolution process.

The kernel K(x, y) is separable if the kernel can be written as the product of two one-dimensional kernels; i.e., $$K(x,y)=h(x)\cdot v(y)$$

wherein h(x) is a horizontal kernel that is a function only of x, and wherein v(y) is a vertical kernel that is a function only of y. If the kernel K(x, y) is separable, then computing C(x, y) reduces to the following simplified form:

$$C(x, y) = \sum_{i=x-floor((n-1)/2)}^{x+ceiling((n-1)/2)} h(|x-i|) \sum_{j=y-floor((n-1)/2)}^{y+ceiling((n-1)/2)} F(i,j) \cdot v(|y-j|)$$

In the preceding formula for C(x, y), vertical convolutions V(i,y) are computed as the scalar product $\Sigma_j F(i,j)v(|y-j|)$. Then C(x, y) is computed as the scalar product (also called the dot product) of h(|x−i|) and V(i,y), wherein h(|x−i|) is a constant horizontal vector denoted as H. Thus computing C(x, y) requires computing n vertical convolutions $V(i_1,y)$, $V(i_2,y), \ldots, V(i_n,y)$ which form an array V, followed by computing C(x, y) as the scalar product of H and V, wherein $i_1 = x-floor((n-1)/2)$, $i_2 = i_1 + 1, \ldots, i_n = i_{n-1} + 1 = x+ceiling((n-1)/2)$.

FIG. 2 is a graphical illustration of how the preceding two-dimensional convolution C(x, y) may be computed with a separable kernel, in accordance with embodiments of the present invention. FIG. 2 depicts a submatrix of F defining a 5×5 array (n=5) used for computing C(x, y) at the point (x, y). The scalar product computed between the vertical kernel v(y) and each of the 5 columns (11-15) of the submatrix is a vertical convolution, resulting in 5 respective scalar products (graphically represented by reference numerals 21-25) which form a 5-element horizontal array 30. A constant horizontal vector 20 formed from h(x) (more specifically, from h(|x−i|)) and denoted as H is used to compute the scalar product between the array 30 (V) and the constant horizontal vector 20 (H), resulting in C(x, y) at pixel (x,y).

A benefit of using the preceding simplified formula for C(x, y) with a separable kernel is that computing the convolution C(x+1,y) at pixel (x+1,y) merely requires computing one new vertical convolution, using the first column to the right of column 15 (not shown), and one horizontal convolution, and the last n−1 vertical convolutions (22-25) are reused. With multiple processors operating in parallel, computing the convolutions C(x, y) at different stripes of the image may be performed in parallel for added efficiency.

The present invention computes convolutions for selected pixels rather than for all pixels of the pixel array 10. A key to achieving this selectivity efficiently is exploiting the spatial locality associated with the convolutions and spatial locality within the selected pixels, by transiently saving previously determined vertical convolutions for potential reuse in the subsequent computation of the two-dimensional convolutions at other pixels on the same row. The present invention uses a novel convolution cache to exploit this spatial locality with negligible overhead. The cache allows reuse of previously computed vertical convolution values, which increasing performance and decreases power and memory requirements. That is achieved without needing to compute convolutions at all pixels in the image.

The present invention uses a simple and highly regular convolution operation, which allows the matrix to be easily segmented among different processors prior to being convoluted. Each processor independently convolutes a stripe. Moreover, the convolution may be a highly data-parallel operation, which makes it amenable to vectorization processing.

The present invention includes a novel memory management scheme that is applicable to multi-core processors that rely on software memory management (such as the Cell BE processor). In one embodiment, the memory management utilizes quad-buffers that allow for overlapped computation and memory access operation, without requiring large buffer sizes.

The present invention has the following advantages over prior art. The invention has significantly less memory requirement than prior art, which makes the present invention more suitable for embedded processors. The present invention operates faster than prior art when spatially selective convolutions are required (as in High dynamic Range (HDR) photographic tone mapping operator). The present invention uses less power, which additionally makes the present invention suitable for embedded processors. The invention is highly scalable and vectorizable on novel multi-core processors. The invention has a novel software memory management scheme that makes it applicable to low-power multi-core designs that relies on software to manage its memory hierarchy (such as the Cell BE processor).

In one embodiment, a multi-core processor is deployed on the Cell BE microprocessor (IBM, Cell Broadband Engine Architecture, October 2006, Version 1.01.), which is a low-power, heterogeneous multi-core design. Cell BE has one PowerPC processor element (PPE) and 8 Synergistic Processing Elements (SPE). Each SPE has a local memory which is software managed and optimized for stream processing.

Figure 3:
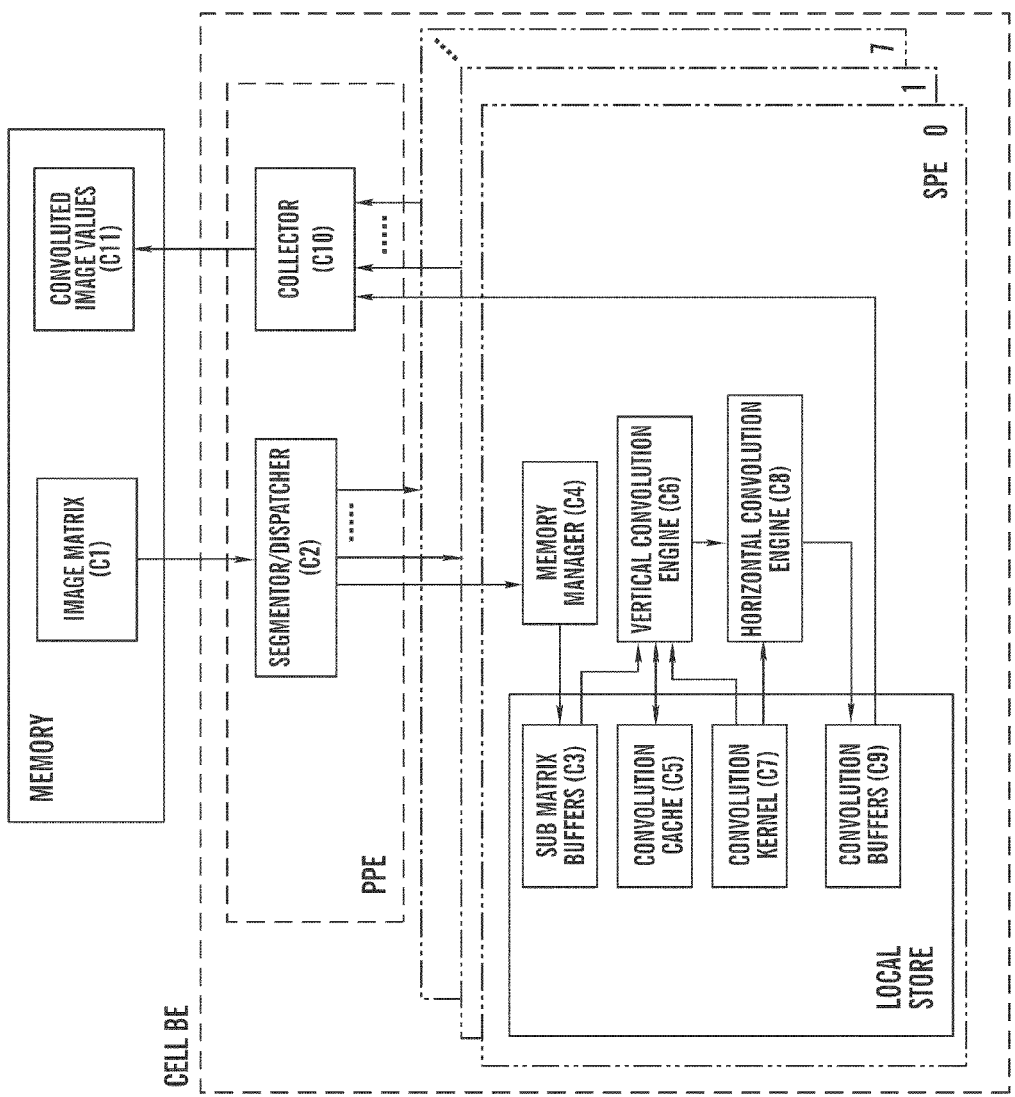
FIG. 3 is a system block diagram for generating a convoluted image in the pixel array of FIG. 1, in accordance with embodiments of the present invention.

FIG. 3 is a system block diagram for generating a convoluted image in the pixel array of FIG. 1, in accordance with embodiments of the present invention. The convoluted image matrix is configured to store a two dimensional convolution at each pixel of the pixel array 10 of FIG. 1. FIG. 3 also shows data flow among system components on a Cell BE processor. The data flow is illustrated by the flow chart in FIG. 4, described infra.

In FIG. 3, Image Matrix (C1) is the input image matrix stored in main memory.

Segmentor/Dispatcher (C2) divides the image into 'overlapped' stripes and dispatches each stripe into an SPE; the components run on the PPE.

Submatrix Buffers (C3) include four input submatrix buffers. Three buffers hold image matrix submatrices, and the fourth buffer is filled by the memory manager (C4) which manages the filling of the submatrix buffers in a circular fashion.

Convolution Cache (C5) comprises CACHE_SIZE entries (powers of two) and a variable that holds a tag of the last saved entry. The cache is used to hold vertical convolution values. The entries are inserted in a circular fashion.

Vertical Convolution Engine (C6) performs a one dimensional (1D) convolution, with the convolution kernel, in the vertical direction (Y).

Convolution Kernel (C7) is the 1D convolution kernel due to the separability of C(x, y).

Horizontal Convolution Engine (C8) performs a 1D convolution, with the convolution kernel, in the horizontal direction (X).

Convolution Buffers (C9) comprise two output buffers. A current processed row is stored in one of the two buffers while the other row is written to memory. Then the buffers are interchanged.

Collector (C10) collects rows from SPEs and stores the rows into memory, forming the convoluted image.

Convoluted Image Values (C11) are convoluted image values which are outputted by the system.

Figure 4:
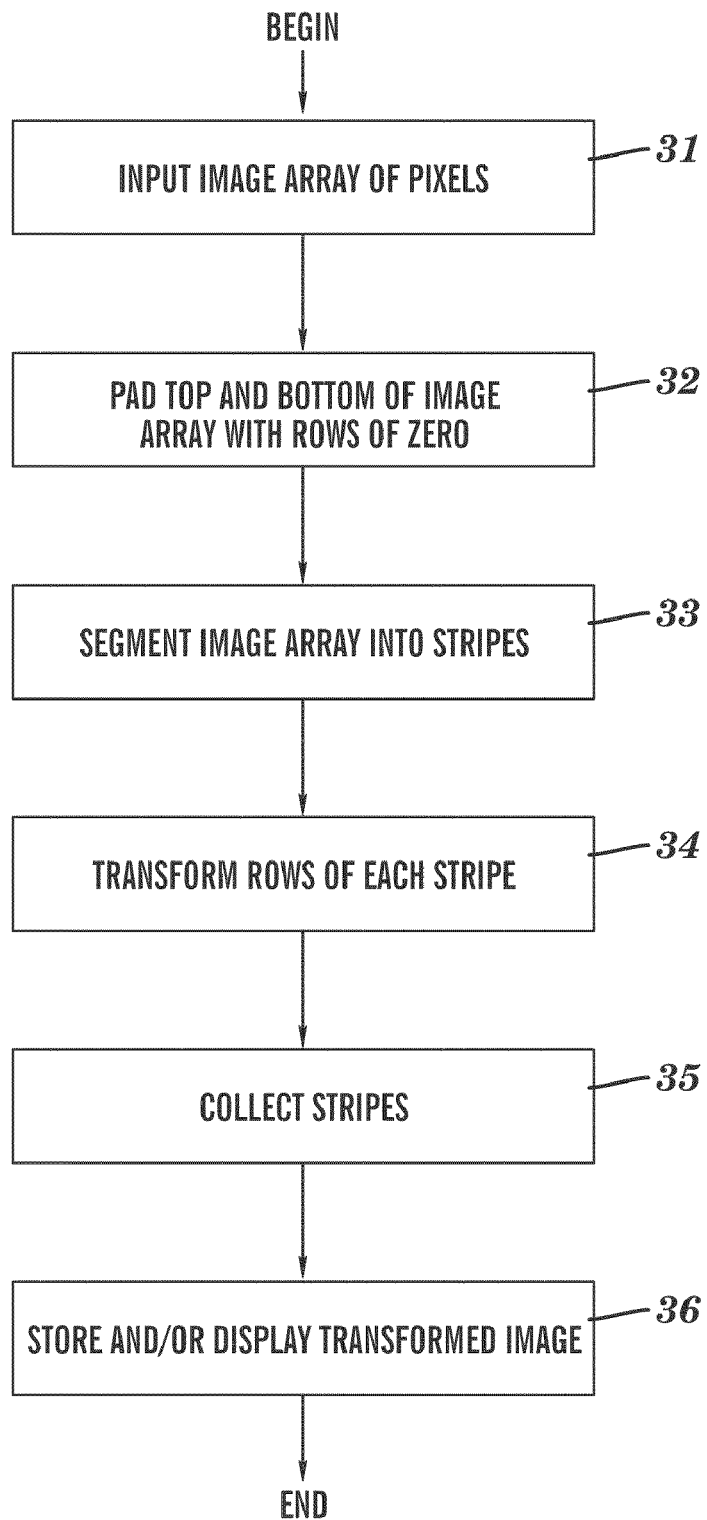
FIG. 4 is a flow chart for generating a convoluted image in the pixel array of FIG. 1, in accordance with embodiments of the present invention.

FIG. 4 is a flow chart for generating the convoluted image in the pixel array of FIG. 1, in accordance with embodiments of the present invention. FIG. 4 comprises steps 31-36.

In step 31, the pixel array 10 for F is inputted and stored into main memory (C1).

Step 32 adds rows containing zero to the top and bottom of the pixel array 10. The number of rows added to the top and bottom of the pixel array 10 is set equal to floor(n/2) and ceiling(n/2), respectively, wherein n is the height (in pixels) of the convolution kernel in the Y direction, the function floor (n/2) is largest integer less than or equal to n/2, and the function ceiling(n/2) is the smallest integer greater than or equal to n/2.

Figure 6:
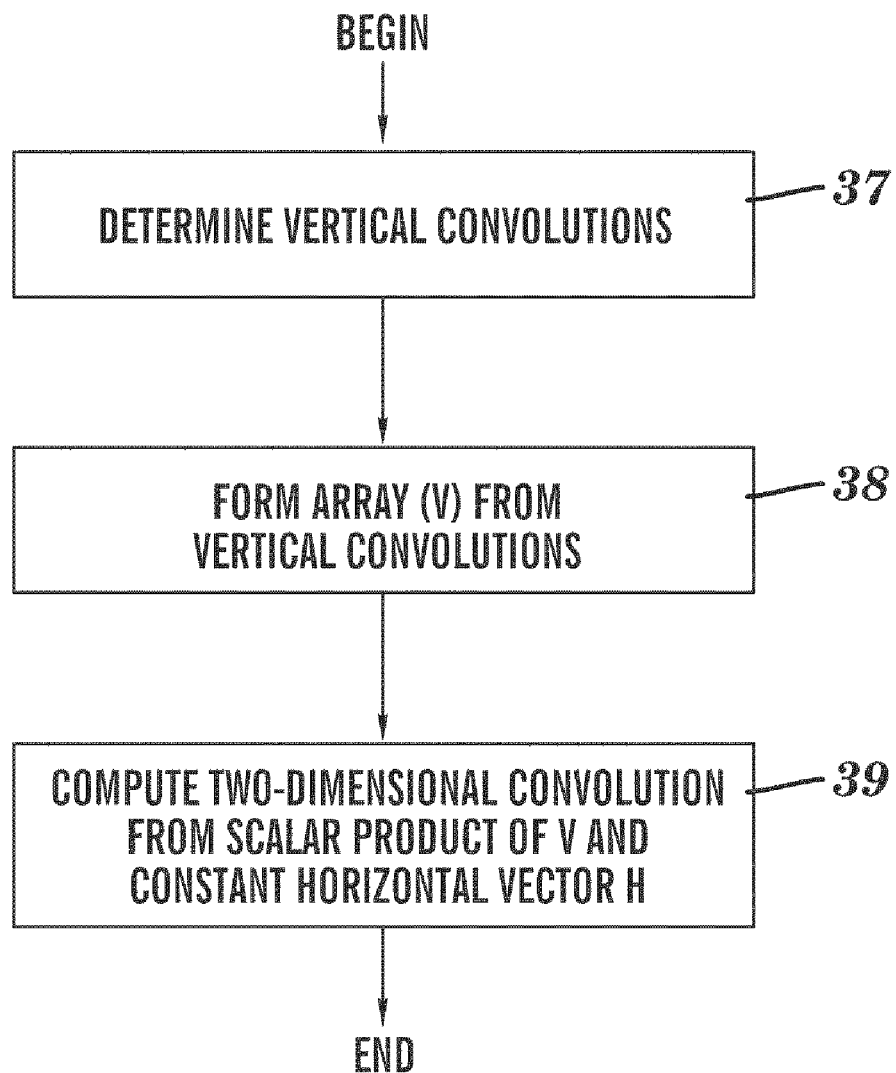
FIG. 6 is a flow chart for determining a two-dimensional convolution at a selected pixel in a stripe, in accordance with embodiments of the present invention.

Step 33 segments the pixel array 10 into one stripe or a plurality of stripes, wherein each stripe consists of a contiguous sequence of rows of the pixel array 10. Each horizontal stripe is dispatched to one SPE under control of the Segmentor/dispatcher component (C2). The stripes are overlapped with a height (n) of the convolution kernel as shown in FIG. 6.

Figure 5:
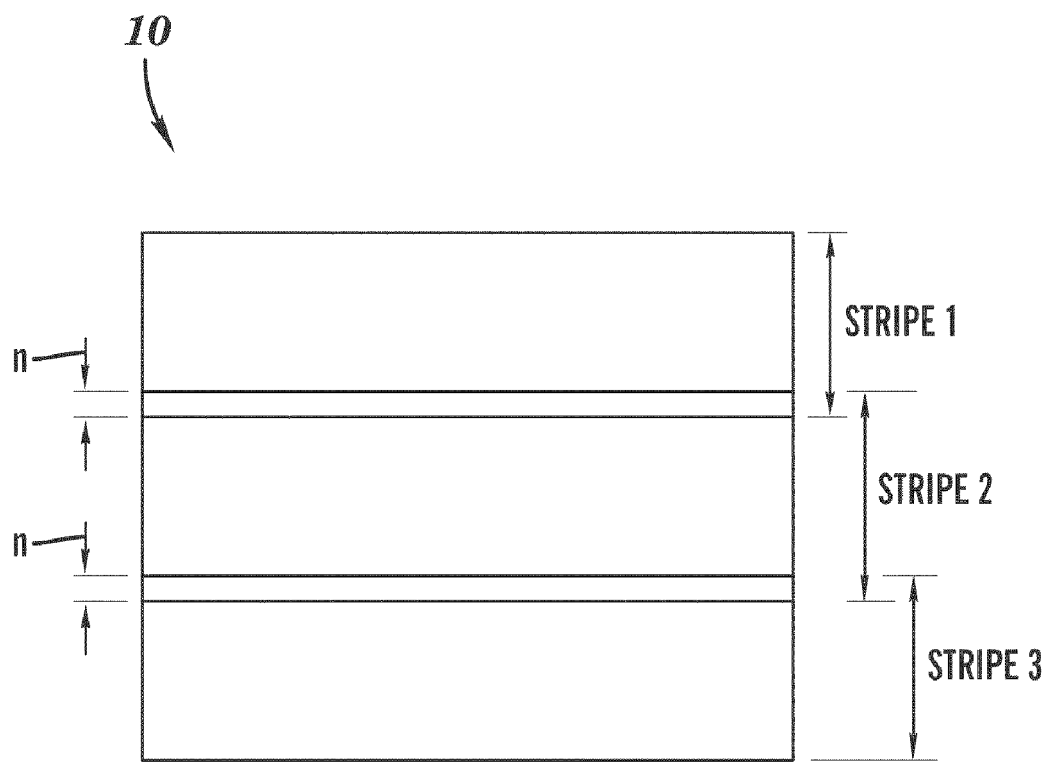
FIG. 5 depicts three stripes of the input image overlapped by the height of a convolution matrix, in accordance with embodiments of the present invention.

FIG. 5 depicts three stripes (Stripe 1, Stripe 2, Stripe 3) of the input array of pixels 10 overlapped by the height (n) of the kernel, in accordance with embodiments of the present invention.

Step 34 of FIG. 4 transforms the rows of each stripe, including determining a two-dimensional convolution C(x, y) of F at only selected pixels (x, y) in each stripe. FIG. 6 describes determining C(x, y) at a selected pixel (x, y) in greater detail.

Figure 7:
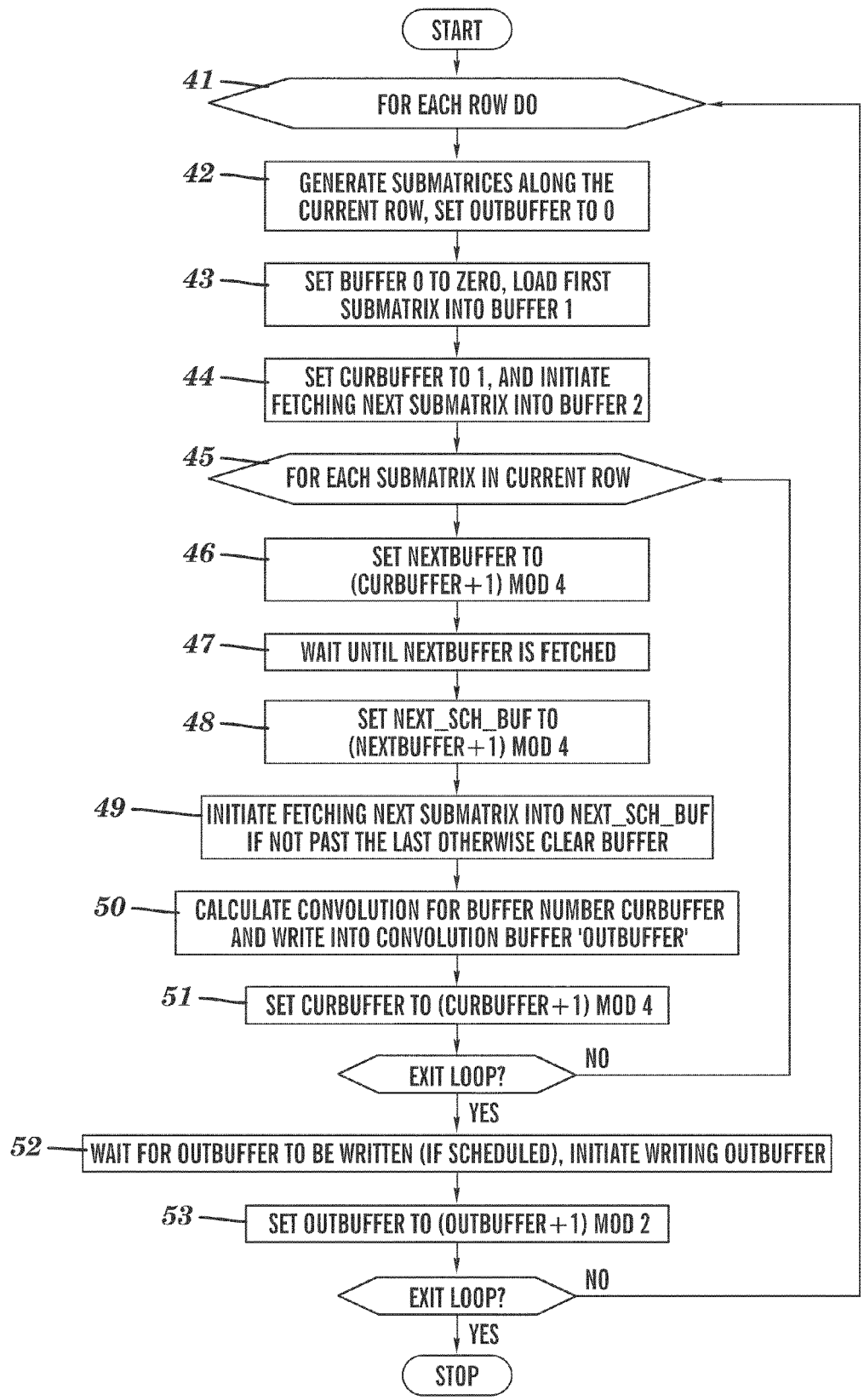
FIG. 7 is a flow chart describing computation in parallel of the two dimensional convolution at the pixels of each stripe using a known convolution kernel, in accordance with embodiments of the present invention.

In step 34 of FIG. 4, each SPE computes (e.g., in parallel) the two dimensional convolution at the pixels of each dispatched stripe using a convolution kernel, as described infra in detail in FIG. 7. In one embodiment, each stripe comprises about a same number of rows, which optimizes the processing efficiency due to parallel processing (i.e., simultaneous processing) of the stripes by the respective SPEs in step 34. "About a same number of rows" means that the number of rows in each stripe cannot differ by more than 1 row from the number of rows in any stripe.

Step 35 collects the stripes from the SPEs to form a transformed image of the convoluted stripes.

Step 36 stores the transformed image into computer readable storage and/or displays the transformed image on a display device.

FIG. 6 is a flow chart for determining the two-dimensional convolution C(x, y) of F at a selected pixel (x, y) in a stripe, in accordance with embodiments of the present invention. FIG. 6 comprises steps 37-39.

Step 37 determines n vertical convolutions such that each vertical convolution is defined as a scalar product of F and v(y) in an n×n kernel space surrounding the selected pixel (x, y).

Step 38 forms the array (V) of dimension n from the n vertical convolutions determined in step 37.

Step 39 computes C(x, y) as a scalar product of V and the constant horizontal vector (H) formed from h(x).

FIG. 7 is a flow chart describing computation (e.g., in parallel), by each SPE, of the two dimensional convolution at the pixels of each stripe using a known convolution kernel, in accordance with embodiments of the present invention. FIG. 7 comprises steps 41-53.

Step 41 initiates an outer loop, wherein each iteration of the outer loop scans a row in the stripe.

Figure 8:
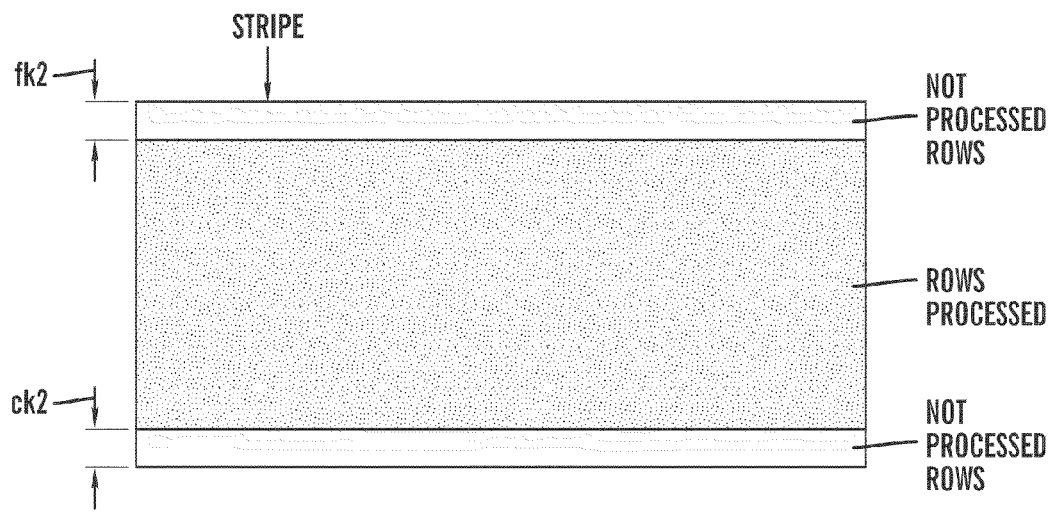
FIG. 8 depicts the structure of a stripe, in accordance with embodiments of the present invention.

FIG. 8 depicts the structure of a stripe, in accordance with embodiments of the present invention. The processed rows of the stripe are disposed between fk2 not processed rows at the top of the stripe and ck2 not processed rows at the bottom of the stripe, wherein fk2=floor(n/2) and ck2=ceiling(n/2). The first row processed 37 in the first iteration is at the top of the stripe.

Figure 9:
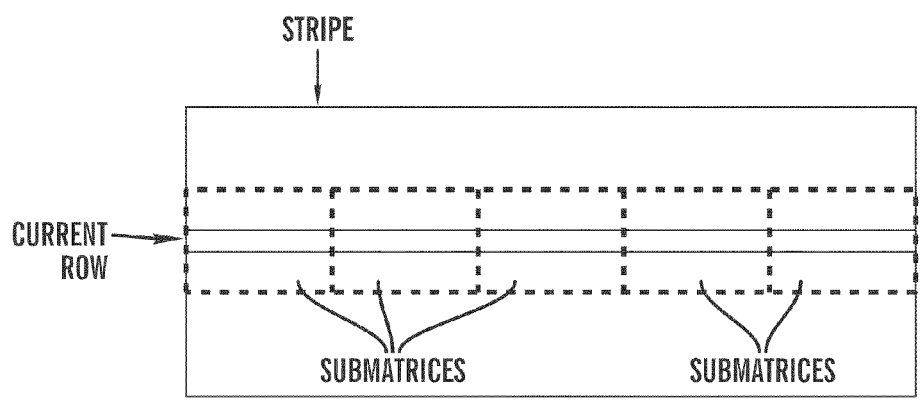
FIG. 9 depicts a current row of a stripe and the submatrices associated with the current row, in accordance with embodiments of the present invention.

Step 42 of FIG. 7 divides the current row into consecutive n×n submatrices such that the current row bisects the submatrices (as shown in FIG. 9), wherein the kernel size n is a positive integer of at least 3. Each submatrix stores values of F(i,j). The height and width of each submatrix is set equal to the kernel size n. The variable 'outbuffer', which is set to zero, points to the convolution buffer (C9) to save convoluted values C(x, y) into.

FIG. 9 depicts a current row of a stripe and the submatrices associated with the current row, in accordance with embodiments of the present invention.

In step 43 of FIG. 7, the memory manager (C4) clears buffer 0 (i.e., stores zeros into buffer 0) and loads the first submatrix (in the current row) into buffer 1 (C3).

In step 44, the variable 'curbuffer' is set to 1 and the memory manager (C4) initiates loading the next submatrix into buffer 2 (C3). Such loading is nonblocking, allowing the following steps (45-51) to proceed without waiting for the load to finish.

Step 45 initiates an inner loop in which each iteration processes a next submatrix of the current row.

Step 46 sets 'nextbuffer' to (curbuffer+1) mod 4. The variable nextbuffer points to the next buffer to load (among four buffers: 0, 1, 2, 3). Each next buffer is determined in a circular manner through use of modulo arithmetic.

Step 47 waits until the buffer pointed to by nextbuffer is fetched. The following steps (48-51) require that for a current block to process, a previous and a next block need to resides in submatrix buffers (C3) SPE local memory.

Step 48 sets 'next_sch_buffer' to (nextbuffer+1) mod 4; i.e., next_sch_buffer points to the next buffer to fill.

Step 49 initiates fetching the next submatrix into the buffer pointed to by next_sch_buffer unless the last submatrix of the current row has been processed, in which case the buffer pointed to by next_sch_buffer is cleared (i.e., all entries are set to zero).

Step 50 selectively calculates convolution(s) for the current submatrix at selected pixels. The current submatrix comprises n elements along the current row respectively corresponding to n subcolumns of the submatrix. The two-dimensional convolution is computed selectively at only specified elements within the submatrix's current row. Each computed convolution is stored in convolution buffer outbuffer. Step 50 is described infra in detail in conjunction with FIGS. 11-12.

Step 51 sets curbuffer to (curbuffer+1) mod 4. Then if all submatrices of the current row have not been processed, the procedure loops back to step 45 to process the next submatrix for the curent row in a next iteration of the inner loop; otherwise the inner loop is exited and step 52 of the outer loop is next executed.

Step 52 waits for the buffer pointed to by outbuffer to be written (if scheduled); then writing the buffer pointed to by outbuffer is initiated.

Step 53 sets outbuffer to (outbuffer+1) mod 2. Then if all rows have not been processed, the procedure loops back to step 41 to process the row in a next iteration of the outer loop; otherwise the outer loop is exited the procedure of FIG. 7 stops.

Figure 10:
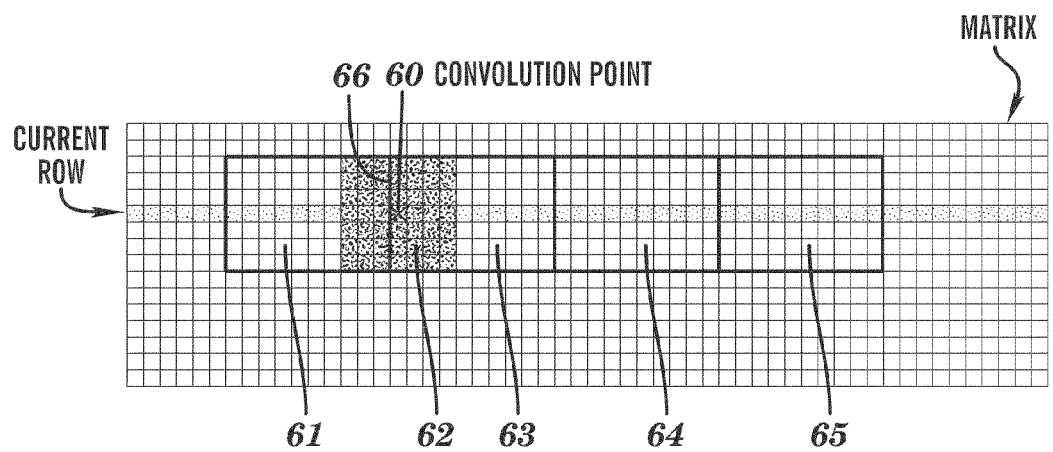
FIG. 10 depicts buffers used for processing the current row, in accordance with embodiments of the present invention.

FIG. 10 depicts buffers used for processing the current row in conjunction with step 50, in accordance with embodiments of the present invention. FIG. 10 depicts successive submatrices 61-65. Pixel 60 in submatrix 62 is being processed in the current row at horizontal pixel index (x, y). As the processing of position 60 is initiated, submatrices 61, 63, and 64 have already been loaded into buffers. Submatrix 65 is in a currently filled buffer. The vertical line 66 divides buffer 62 into a left part adjacent to buffer 61 and a right part adjacent to buffer 63. Since the position 60 is in the right part of buffer 62, the procedure will read values of F from submatrix 63 or 64 to the right of submatrix 62. If the position 60 were in the left part of buffer 62, the procedure will read values of F from submatrix 61 to the left of submatrix 62.

More specifically, both the buffer number of the buffer to be read ($B_R$) and the horizontal offset (OFFSET) within buffer $B_R$ define the column of values of F to be read and then used for computing the two-dimensional convolution at position 60. Recalling that n denotes the submatrix width, $B_R$ and OFFSET are calculated via:

$$B_R = \text{floor}(x/n); \text{ and}$$

$$\text{OFFSET} = x \bmod n.$$

If each buffer has horizontal positions 1, 2, ..., then the horizontal position within the buffer corresponding to OFFSET is 1+OFFSET. For example, if n=5 and x=13, then $B_R$=2 and OFFSET=3 and (1+OFFSET)=4, so that the next column of values of F will be read from horizontal position 4 within buffer 2.

Figure 11:
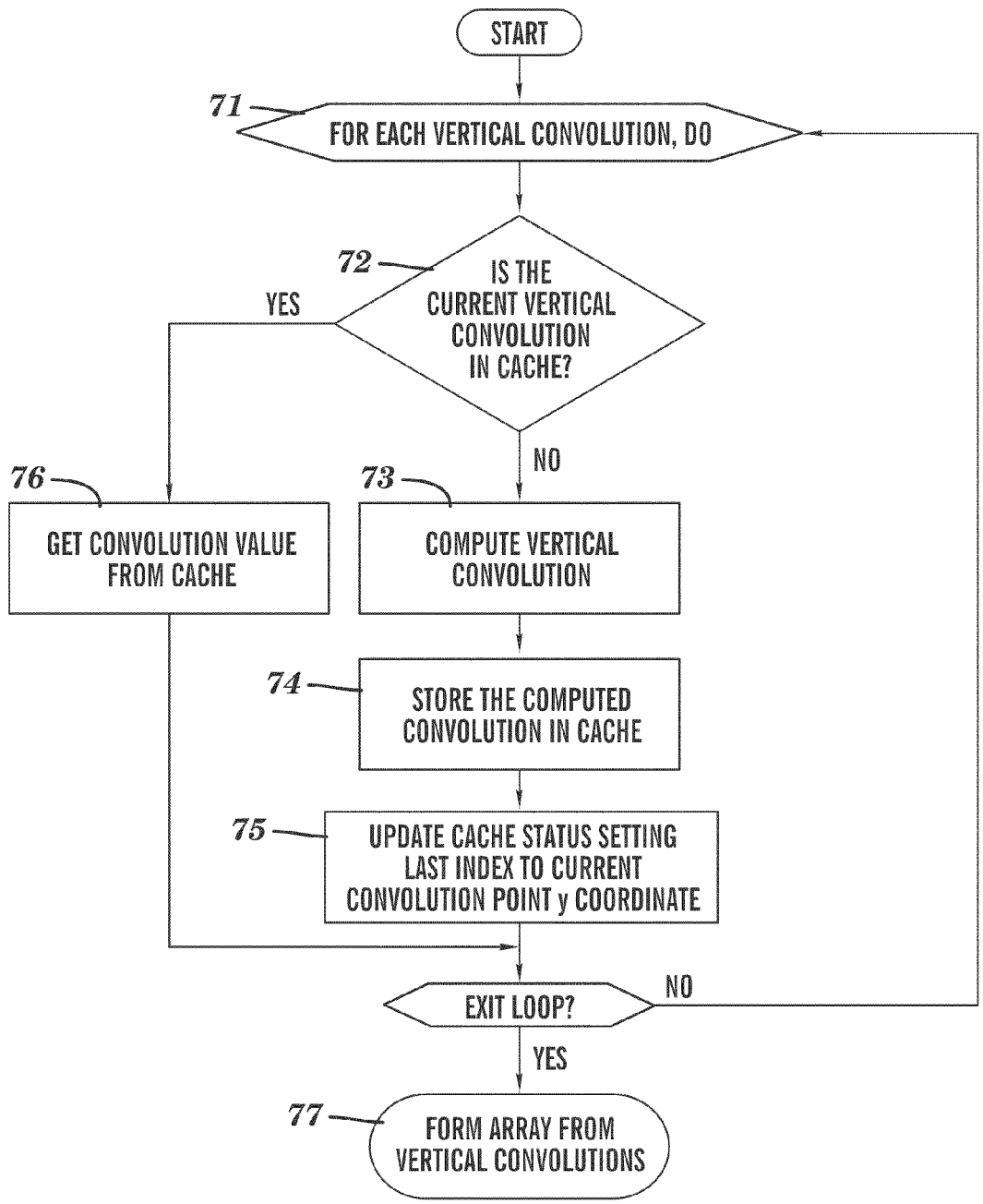
FIG. 11 is a flow chart describing a determination and storage of vertical convolutions in a cache for a current pixel being processed, in accordance with embodiments of the present invention.

FIG. 11 is a flow chart describing a determination and storage of vertical convolutions in a cache for a current pixel being processed, in accordance with embodiments of the present invention.

FIG. 11 is a flow chart describing computation and storage of n vertical convolution V(i,y) (i=1, 2, ..., n) in a convolution cache of dimension (n−1) for the current pixel (x, y) being processed, in accordance with embodiments of the present invention. V(i,y) is computed in accordance $V(i,y) = \Sigma_j F(i,j) v(|y-j|)$ as described supra. The cache positions are numbered sequentially as 0, 1, 2, ..., n−2.

Step 71 initiates a loop of n iterations for determining a vertical convolution in each iteration i of the loop. A vertical convolution for pixel (i, y) in iteration i, wherein i=$i_1, i_2, ..., i_{n-1}, i_n$ such that $i_1 = x - \text{floor}((n-1)/2)$, $i_2 = i_1 + 1$, ..., and $i_n = i_{n-1} + 1 = x + \text{ceiling}((n-1)/2)$. The loop comprises steps 72-76.

Step 72 ascertains whether a vertical convolution for pixel (i, y) of the current row is in the cache. The cache consists of (n−1) storage locations If step 72 ascertains that the vertical convolution for pixel (i, y) of the current row is in the cache, then step 76 reads the vertical convolution for pixel (i, y) from the cache. In one embodiment, step 76 reads the vertical convolution for pixel (i, y) from cache position i mod (n−1) since the cache consists of (n−1) positions. After step 76, if all n vertical convolutions have not been determined, then the procedure loops back to step 71 to perform the next iteration of the loop for the next vertical convolution; otherwise the loop is exited and step 77 is next performed.

If step 72 ascertains that the vertical convolution for pixel (i, y) of the current row is not in the cache, then step 73 computes the vertical convolution for pixel (i, y) as the scalar product of F and v(y) at pixel (i, y) in the kernel space surrounding pixel (x, y).

Step 74 stores the computed vertical convolution for pixel (i, y) in the cache. In one embodiment, step 74 stores the computed vertical convolution for pixel (i, y) in the cache position i mod (n−1) since the cache consists of (n−1) positions.

In one embodiment, step 75 is performed. Step 75 sets a variable LAST to the horizontal coordinate i pixel position (i, y).

After step 75 (or step 74 if step 75 is not performed), if all n vertical convolutions have not been determined, then the procedure loops back to step 71 to perform the next iteration of the loop for the next vertical convolution; otherwise the loop is exited and step 77 is next performed.

Step 77 forms the array V from the n vertical convolutions for use to subsequently form the scalar product of V and the corresponding constant horizontal vector H.

In one embodiment, step 72 is performed through use of the variable LAST (see step 75) which is initially set to a negative number (e.g., −1) before each row in each stripe is processed. Step 72 ascertains that the vertical convolution for pixel (i, y) of the current row is in the cache if i is less than or equal to LAST; otherwise step 72 ascertains that the vertical convolution for pixel (i, y) of the current row is not in the cache.

Figure 12:
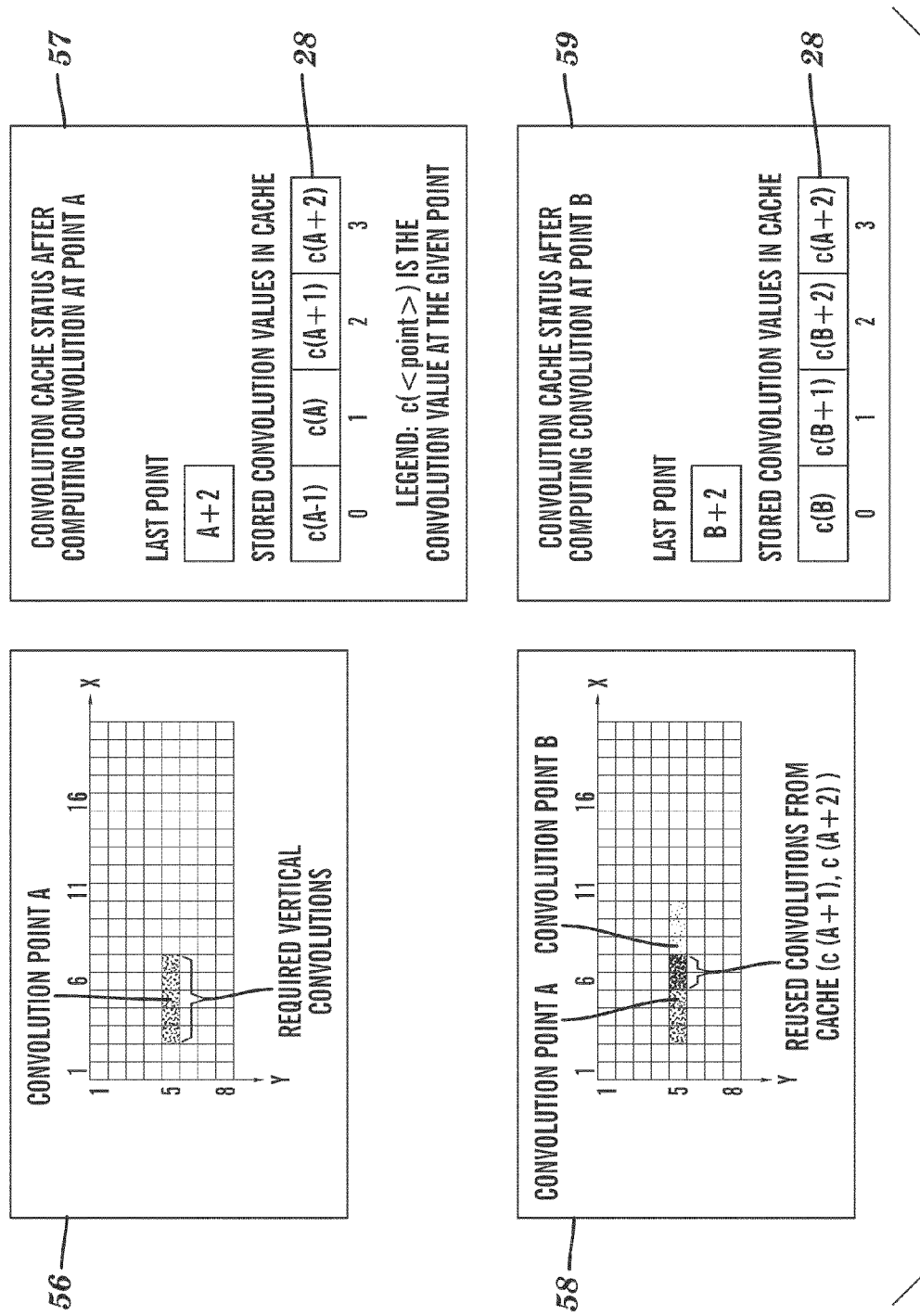
FIG. 12 is an example illustrating the determination and storage of vertical convolutions in a cache for a current pixel being processed, in accordance with embodiments of the present invention.

FIG. 12 is an example illustrating the determination and storage of vertical convolutions in a cache for a current pixel being processed, in accordance with embodiments of the present invention. FIG. 12 conforms to the procedure described in the flow chart of FIG. 11. FIG. 12 presents views 56-59.

In view 56, row 5 is the current row and pixel A is the current pixel processed at which the two-dimensional convolution is computed and 5 vertical convolutions have been determined. Pixel A is at column 5 (x=5). The convolution matrix is a 5×5 square; i.e., n=5. The vertical convolutions pertaining to pixel A are to be determined for pixels (i, 5), wherein i=3, 4, 5, 6, 7 in the order of 3, 4, 5, 6, 7 in the X direction.

View 57 depicts the cache 28 after pixel A has been processed. The cache 28 consists of 4 positions (generally, the cache consists of the n−1 positions of 0, 1, 2, ..., n−2) denoted as positions 0, 1, 2, 3. The last 4 vertical convolutions (c(A−1), c(A), c(A+1), c(A+2)) stored in the cache 28 are in positions 4, 5, 6, 7, respectively. Therefore, LAST is set equal to 7, since c(A+2) for i=7 is the last pixel written in the cache 28.

View 58 shows pixel B as the next pixel to be processed at which the two-dimensional convolution is to be computed and 5 vertical convolutions are to be determined. Pixel B is at column 8 (x=8). Thus the two-dimensional convolution is not computed at x=6 and x=7 in the current row. The vertical convolutions pertaining to pixel B are to be determined for pixels (i, 5), wherein i=6, 7, 8, 9, 10 in the order of 6, 7, 8, 9, 10 in the X direction. View 59 depicts the cache 28 after pixel B has been processed which is described as follows.

For pixel 6, i=6 is less than or equal to LAST=7. Therefore, the vertical convolution is read from the cache 28 at position i mod (n−1)=6 mod 4=2. Indeed, the vertical convolution C(A+1) corresponding to i=6 is read from position 2 in the cache 28. Thus, the cache 28 remains unchanged as a result of processing i=6.

For pixel 7, i=7 is less than or equal to LAST=7. Therefore, the vertical convolution is read from the cache 28 at position i mod (n−1)=7 mod 4=3. Indeed, the vertical convolution C(A+2) corresponding to i=7 is read from position 3 in the cache 28. Thus, the cache 28 remains unchanged as a result of processing i=7.

For pixel 8, i=8 which exceeds LAST=7. Therefore, the vertical convolution for i=8 is computed and stored in the cache 28 at position i mod (n−1)=8 mod 4=0. Thus, the computed vertical convolution for i=8, namely c(B), is stored in position 0 of the cache 28 as shown in view 59. Then LAST is set to 8.

For pixel 9, i=9 which exceeds LAST=8. Therefore, the vertical convolution for i=9 is computed and stored in the cache 28 at position i mod (n−1)=9 mod 4=1. Thus, the computed vertical convolution for i=9, namely c(B+1), is stored in position 1 of the cache 28 as shown in view 59. Then LAST is set to 9.

For pixel 10, i=10 which exceeds LAST=9. Therefore, the vertical convolution for i=10 is computed and stored in the cache 28 at position i mod (n−1)=10 mod 4=2. Thus, the computed vertical convolution for i=10, namely c(B+2), is stored in position 2 of the cache 28 as shown in view 59. Then LAST is set to 10. Note that c(A+2), which is the same as c(B−1), remains in position 3 in the cache 28 and is unchanged from the result of processing pixel A.

FIG. 12 illustrates an embodiment in which: a current row y of a current stripe comprises a contiguous ordered sequence of a selected pixel (S1) at which C(x, y) is determined; u unselected pixels at which C(x, y) is not determined such that $1 \leq u \leq (n-2)$; and a selected pixel (S2) at which C(x y) is determined after C(x, y) at S1 is determined. In one embodiment u=1, in one embodiment u=2, . . . , and in one embodiment u=n−2.

In FIG. 12 with respect to the preceding embodiment: the current row is row 5, pixel S1 is represented by pixel A, pixel S2 is represented by pixel B, and u=2.

Figure 13:
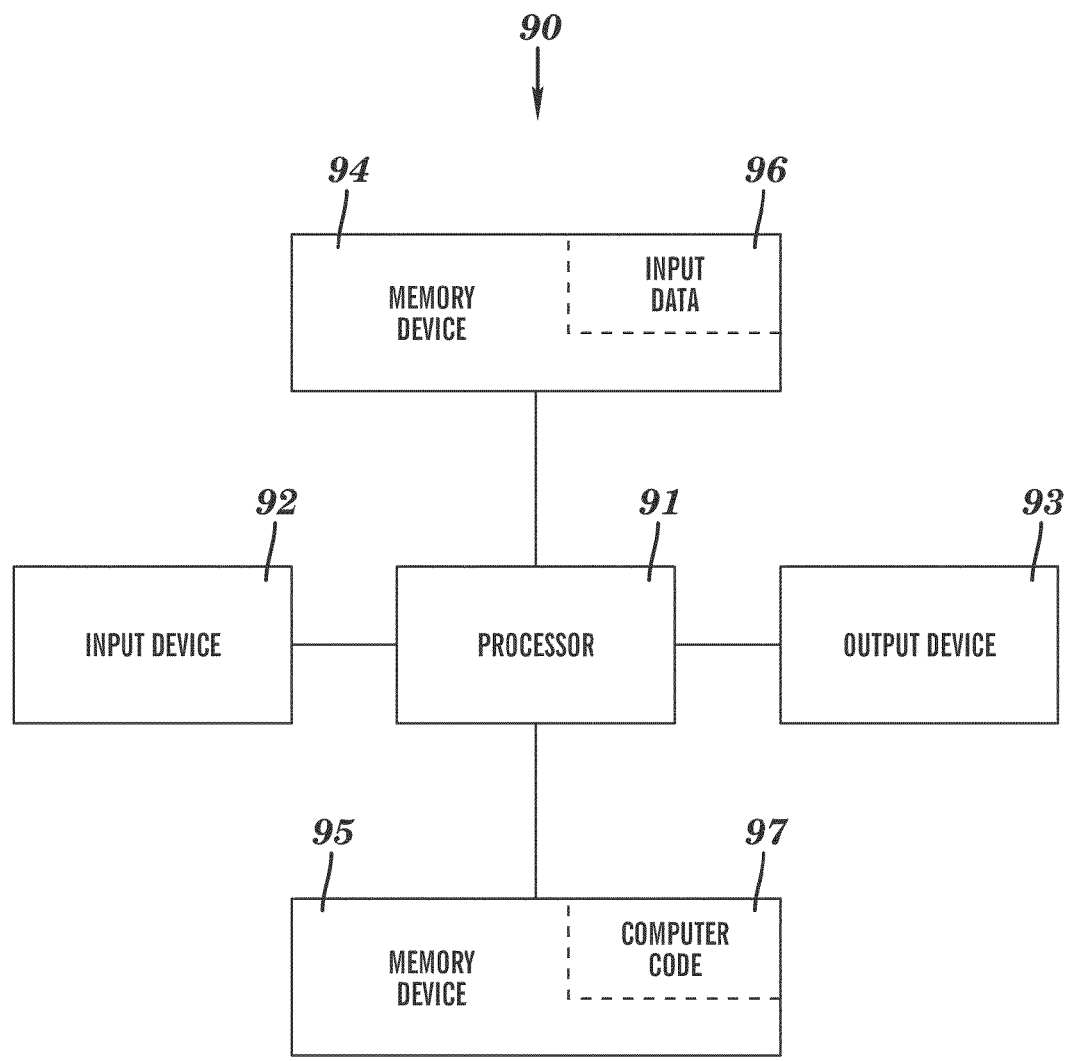
FIG. 13 illustrates a computer system used for transforming a spatially varying optical characteristic of an image in an array of pixels, in accordance with embodiments of the present invention.

FIG. 13 illustrates a computer system 90 used for selectively transforming a spatially varying optical characteristic of an image in an array of pixels, in accordance with embodiments of the present invention. The computer system 90 comprises a processor 91, an input device 92 coupled to the processor 91, an output device 93 coupled to the processor 91, and memory devices 94 and 95 each coupled to the processor 91. The processor 91 is a processing unit such as a central processing unit (CPU). The input device 92 may be, inter alia, a keyboard, a mouse, etc. The output device 93 may be, inter alia, a printer, a plotter, a display device (e.g., a computer screen), a magnetic tape, a removable hard disk, a floppy disk, etc. The display device may comprise the display area 10 of FIG. 1. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for selectively transforming a spatially varying optical characteristic of an image in an array of pixels. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 13) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 13 shows the computer system 90 as a particular configuration of hardware and software, any configuration of hardware and software, as would be known to a person of ordinary skill in the art, may be utilized for the purposes stated supra in conjunction with the particular computer system 90 of FIG. 13. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for selectively transforming a spatially varying optical characteristic (F) of an image in an array of pixels, said array characterized by NY rows of pixels oriented in an X direction and NX columns of pixels oriented in a Y direction, said NX and NY each at least 5, said optical characteristic denoted as F(x,y) such that x and y are indexes of pixels in the X and Y directions, said method implemented by execution of instructions by a processor of a computer system, said instructions being stored on computer readable storage media of the computer system, said method comprising:
    segmenting the array of pixels into at least one stripe, wherein each stripe consists of a contiguous sequence of rows of the array of pixels;
    transforming the rows of each stripe, said transforming comprising determining a two-dimensional convolution C(x, y) of F at only selected pixels (x, y) in each stripe, wherein C(x, y) is a function of a product of a horizontal kernel h(x) and a vertical kernel v(y), said h(x) and v(y) each of dimension $n \geq 3$, wherein said determining C(x, y) at each selected pixel (x, y) in each row of each stripe comprises: determining n vertical convolutions such that each vertical convolution is equal to a scalar product of F and v(y) in a kernel space surrounding (x,y), forming an array (V) of dimension n from the n vertical convolutions, and computing C(x,y) as a scalar product of V and a constant horizontal vector (H) formed from h(x);
    after said transforming, collecting the stripes to form a transformed image;
    storing and/or displaying the transformed image,
    wherein a current row of a current stripe of the at least one stripe comprises a contiguous ordered sequence of a selected pixel (S1) at which C(x, y) is determined, u unselected pixels at which C(x, y) is not determined such that $1 \leq u \leq (n-2)$, and a selected pixel (S2) at which C(x y) is determined after C(x, y) at S1 is determined.

2. The method of claim 1, wherein the at least one stripe consists of a plurality of stripes, wherein each stripe comprises about a same number of rows, and wherein said transforming the rows of each stripe is performed simultaneously for the plurality of stripes.

3. The method of claim 1,
    wherein determining C(x, y) at S1 results in n−1 vertical convolutions of the n vertical convolutions determined at S1 being stored in a convolution cache of dimension n−1;
    wherein m vertical convolutions of the n vertical convolutions determined for S2 is a subset of the n−1 vertical convolutions stored in the cache such that m=n−1−u;
    wherein determining C(x, y) at S2 comprises reading the m vertical convolutions from the cache and does not comprise computing the m vertical convolutions as the scalar product of F and v(y) in the kernel space surrounding S2.

4. The method of claim 3, wherein the cache locations are numbered sequentially as 0, 1, . . . , n−2, wherein said determining C(x, y) at S2 comprises determining a vertical convolution for each pixel (i, y) for i=$i_1, i_2, \ldots, i_{n-1}, i_n$ such that $i_1$=x−floor((n−1)/2), $i_2=i_1+1, \ldots$, and $i_n=i_{n-1}+1$=x+ceiling((n−1)/2), and wherein said determining a vertical convolution for each pixel (i, y) comprises:
    ascertaining whether a vertical convolution for pixel (i, y) is in the cache;
    if said ascertaining ascertains that the vertical convolution for pixel (i, y) is in the cache, then reading the vertical convolution for pixel (i, y) from the cache;
    if said ascertaining ascertains that the vertical convolution for pixel (i, y) is not in the cache, then computing the vertical convolution for pixel (i, y) as the scalar product of F and v(y) at pixel (i, y) in the kernel space surrounding S2, followed by storing the computed vertical convolution for pixel (i, y) in the cache.

5. The method of claim 4,
wherein said reading the vertical convolution for pixel (i, y) from the cache comprises reading the vertical convolution for pixel (i, y) from cache position i mod(n−1);
wherein said storing the computed vertical convolution for pixel (i, y) in the cache comprises storing the computed vertical convolution for pixel (i, y) at cache position i mod(n−1).

6. The method of claim 5,
wherein if said ascertaining ascertains that the vertical convolution for pixel (i, y) of the is not in the cache, then after said storing the computed vertical convolution for pixel (i, y) in the cache: setting a variable LAST to i;
wherein said ascertaining comprises ascertaining that the vertical convolution for pixel (i, y) is in the cache if i is less than or equal to LAST, otherwise ascertaining that the vertical convolution for pixel (i, y) is not in the cache.

7. The method of claim 3,
wherein determining C(x, y) at S2 comprises reading a subcolumn of values of F from a buffer ($B_R$) at a horizontal position of (1+OFFSET) within buffer $B_R$; and
wherein prior to said reading the subcolumn of values of F the method further comprises determining $B_R$ as equal to floor(x/n) and determining OFFSET as equal to x mod n.

8. A computer program product stored on a computer readable storage device, said computer program product comprising the storage device, said storage device having a computer readable program code stored therein, said computer readable program code containing instructions that when executed by a processor of a computer system implement a method for selectively transforming a spatially varying optical characteristic (F) of an image in an array of pixels, said array characterized by NY rows of pixels oriented in an X direction and NX columns of pixels oriented in a Y direction, said NX and NY each at least 5, said optical characteristic denoted as F(x,y) such that x and y are indexes of pixels in the X and Y directions, said method comprising:
segmenting the array of pixels into at least one stripe, wherein each stripe consists of a contiguous sequence of rows of the array of pixels;
transforming the rows of each stripe, said transforming comprising determining a two-dimensional convolution C(x, y) of F at only selected pixels (x, y) in each stripe, wherein C(x, y) is a function of a product of a horizontal kernel h(x) and a vertical kernel v(y), said h(x) and v(y) each of dimension n≧3, wherein said determining C(x, y) at each selected pixel (x, y) in each row of each stripe comprises: determining n vertical convolutions such that each vertical convolution is equal to a scalar product of F and v(y) in a kernel space surrounding (x,y), forming an array (V) of dimension n from the n vertical convolutions, and computing C(x,y) as a scalar product of V and a constant horizontal vector (H) formed from h(x);
after said transforming, collecting the stripes to form a transformed image;
storing and/or displaying the transformed image,
wherein a current row of a current stripe of the at least one stripe comprises a contiguous ordered sequence of a selected pixel (S1) at which C(x, y) is determined, u unselected pixels at which C(x, y) is not determined such that 1≦u≦(n−2), and a selected pixel (S2) at which C(x y) is determined after C(x, y) at S1 is determined.

9. The computer program product of claim 8, wherein the at least one stripe consists of a plurality of stripes, wherein each stripe comprises about a same number of rows, and wherein said transforming the rows of each stripe is performed simultaneously for the plurality of stripes.

10. The computer program product of claim 8,
wherein determining C(x, y) at S1 results in n−1 vertical convolutions of the n vertical convolutions determined at S1 being stored in a convolution cache of dimension n−1;
wherein m vertical convolutions of the n vertical convolutions determined for S2 is a subset of the n−1 vertical convolutions stored in the cache such that m=n−1−u;
wherein determining C(x, y) at S2 comprises reading the m vertical convolutions from the cache and does not comprise computing the m vertical convolutions as the scalar product of F and v(y) in the kernel space surrounding S2.

11. The computer program product of claim 10, wherein the cache locations are numbered sequentially as 0, 1, . . . , n−2, wherein said determining C(x, y) at S2 comprises determining a vertical convolution for each pixel (i, y) for i=$i_1$, $i_2$, . . . , $i_{n-1}$, $i_n$ such that $i_1$=x−floor((n−1)/2), $i_2$=$i_1$+1, . . . , and $i_n$=$i_{n-1}$+1=x+ceiling((n−1)/2), and wherein said determining a vertical convolution for each pixel (i, y) comprises:
ascertaining whether a vertical convolution for pixel (i, y) is in the cache;
if said ascertaining ascertains that the vertical convolution for pixel (i, y) is in the cache, then reading the vertical convolution for pixel (i, y) from the cache;
if said ascertaining ascertains that the vertical convolution for pixel (i, y) is not in the cache, then computing the vertical convolution for pixel (i, y) as the scalar product of F and v(y) at pixel (i, y) in the kernel space surrounding S2, followed by storing the computed vertical convolution for pixel (i, y) in the cache.

12. The computer program product of claim 11,
wherein said reading the vertical convolution for pixel (i, y) from the cache comprises reading the vertical convolution for pixel (i, y) from cache position i mod(n−1);
wherein said storing the computed vertical convolution for pixel (i, y) in the cache comprises storing the computed vertical convolution for pixel (i, y) at cache position i mod(n−1).

13. The computer program product of claim 12,
wherein if said ascertaining ascertains that the vertical convolution for pixel (i, y) of the is not in the cache, then after said storing the computed vertical convolution for pixel (i, y) in the cache: setting a variable LAST to i;
wherein said ascertaining comprises ascertaining that the vertical convolution for pixel (i, y) is in the cache if i is less than or equal to LAST, otherwise ascertaining that the vertical convolution for pixel (i, y) is not in the cache.

14. The computer program product of claim 10,
wherein determining C(x, y) at S2 comprises reading a subcolumn of values of F from a buffer ($B_R$) at a horizontal position of (1+OFFSET) within buffer $B_R$; and
wherein prior to said reading the subcolumn of values of F the method further comprises determining $B_R$ as equal to floor(x/n) and determining OFFSET as equal to x mod n.

15. A computer system comprising a processor and a computer readable memory unit coupled to the processor, said memory unit containing instructions that when executed by the processor implement a method for selectively transforming a spatially varying optical characteristic (F) of an image in an array of pixels, said array characterized by NY rows of pixels oriented in an X direction and NX columns of pixels oriented in a Y direction, said NX and NY each at least 5, said optical characteristic denoted as F(x,y) such that x and y are indexes of pixels in the X and Y directions, said method comprising:

segmenting the array of pixels into at least one stripe, wherein each stripe consists of a contiguous sequence of rows of the array of pixels;

transforming the rows of each stripe, said transforming comprising determining a two-dimensional convolution $C(x, y)$ of F at only selected pixels $(x, y)$ in each stripe, wherein $C(x, y)$ is a function of a product of a horizontal kernel $h(x)$ and a vertical kernel $v(y)$, said $h(x)$ and $v(y)$ each of dimension $n \geq 3$, wherein said determining $C(x, y)$ at each selected pixel $(x, y)$ in each row of each stripe comprises: determining n vertical convolutions such that each vertical convolution is equal to a scalar product of F and $v(y)$ in a kernel space surrounding $(x,y)$, forming an array (V) of dimension n from the n vertical convolutions, and computing $C(x,y)$ as a scalar product of V and a constant horizontal vector (H) formed from $h(x)$;

after said transforming, collecting the stripes to form a transformed image;

storing and/or displaying the transformed image, wherein a current row of a current stripe of the at least one stripe comprises a contiguous ordered sequence of a selected pixel (S1) at which $C(x, y)$ is determined, u unselected pixels at which $C(x, y)$ is not determined such that $1 \leq u \leq (n-2)$, and a selected pixel (S2) at which $C(x, y)$ is determined after $C(x, y)$ at S1 is determined.

16. The computer system of claim 15, wherein the at least one stripe consists of a plurality of stripes, wherein each stripe comprises about a same number of rows, and wherein said transforming the rows of each stripe is performed simultaneously for the plurality of stripes.

17. The computer system of claim 15, wherein determining $C(x, y)$ at S1 results in n−1 vertical convolutions of the n vertical convolutions determined at S1 being stored in a convolution cache of dimension n−1;

wherein m vertical convolutions of the n vertical convolutions determined for S2 is a subset of the n−1 vertical convolutions stored in the cache such that m=n−1−u;

wherein determining $C(x, y)$ at S2 comprises reading the m vertical convolutions from the cache and does not comprise computing the m vertical convolutions as the scalar product of F and $v(y)$ in the kernel space surrounding S2.

18. The computer system of claim 17, wherein the cache locations are numbered sequentially as $0, 1, \ldots, n-2$, wherein said determining $C(x, y)$ at S2 comprises determining a vertical convolution for each pixel $(i, y)$ for $i = i_1, i_2, \ldots, i_{n-1}, i_n$ such that $i_1 = x - \text{floor}((n-1)/2), i_2 = i_1 + 1, \ldots,$ and $i_n = i_{n-1} + 1 = x + \text{ceiling}((n-1)/2)$, and wherein said determining a vertical convolution for each pixel $(i, y)$ comprises:

ascertaining whether a vertical convolution for pixel $(i, y)$ is in the cache;

if said ascertaining ascertains that the vertical convolution for pixel $(i, y)$ is in the cache, then reading the vertical convolution for pixel $(i, y)$ from the cache;

if said ascertaining ascertains that the vertical convolution for pixel $(i, y)$ is not in the cache, then computing the vertical convolution for pixel $(i, y)$ as the scalar product of F and $v(y)$ at pixel $(i, y)$ in the kernel space surrounding S2, followed by storing the computed vertical convolution for pixel $(i, y)$ in the cache.

19. The computer system of claim 18, wherein said reading the vertical convolution for pixel $(i, y)$ from the cache comprises reading the vertical convolution for pixel $(i, y)$ from cache position $i \bmod (n-1)$;

wherein said storing the computed vertical convolution for pixel $(i, y)$ in the cache comprises storing the computed vertical convolution for pixel $(i, y)$ at cache position $i \bmod (n-1)$.

20. The computer system of claim 19, wherein if said ascertaining ascertains that the vertical convolution for pixel $(i, y)$ of the is not in the cache, then after said storing the computed vertical convolution for pixel $(i, y)$ in the cache: setting a variable LAST to i;

wherein said ascertaining comprises ascertaining that the vertical convolution for pixel $(i, y)$ is in the cache if i is less than or equal to LAST, otherwise ascertaining that the vertical convolution for pixel $(i, y)$ is not in the cache.

\* \* \* \* \*